United States Patent
Cho

(10) Patent No.: US 8,345,017 B1
(45) Date of Patent: Jan. 1, 2013

(54) TOUCH INPUT GESTURE BASED COMMAND

(75) Inventor: Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/432,945

(22) Filed: Mar. 28, 2012

Related U.S. Application Data

(60) Provisional application No. 61/606,470, filed on Mar. 4, 2012.

(51) Int. Cl.
  *G06F 3/041* (2006.01)
(52) U.S. Cl. .......................... 345/173; 715/863
(58) Field of Classification Search .......... 345/173–179, 345/156; 178/18.01–18.09, 18.11, 19.01–19.07; 715/863
See application file for complete search history.

(56) References Cited

U.S. PATENT DOCUMENTS

| | | | | |
|---|---|---|---|---|
| 6,088,481 | A * | 7/2000 | Okamoto et al. | 382/189 |
| 7,519,223 | B2 * | 4/2009 | Dehlin et al. | 382/203 |
| 7,825,922 | B2 * | 11/2010 | Keely et al. | 345/418 |
| 2003/0038821 | A1 | 2/2003 | Kraft | |
| 2006/0239561 | A1 * | 10/2006 | Huapaya et al. | 382/187 |
| 2007/0180400 | A1 * | 8/2007 | Zotov et al. | 715/788 |
| 2010/0070878 | A1 | 3/2010 | Amento et al. | |
| 2011/0078568 | A1 * | 3/2011 | Park et al. | 715/702 |
| 2012/0117505 | A1 * | 5/2012 | Koch et al. | 715/773 |

* cited by examiner

*Primary Examiner* — Stephen Sherman
(74) *Attorney, Agent, or Firm* — Birch, Stewart, Kolasch & Birch, LLP

(57) ABSTRACT

A touch input gesture made on a touch sensitive display is described for providing a quick and efficient method for initiating the opening of a text input box. The initiation of opening the text input box following the touch input gesture may be made during the running of a separate application. Further, certain characteristics related to the shape, size and length of the touch input gesture will be referenced to determine certain characteristics of the text input box that is initiated in response to the touch input gesture.

30 Claims, 20 Drawing Sheets

| Characteristic | 1 | 2 |
|---|---|---|
| Text Input Box Width | Length of a Second Component of a user's Touch Input Gesture | Length of a user's Text input Gesture |
| Text Input Box Height | Predetermined length | Follow process for determining the width of the Text Input Box |
| Text Box/Virtual Keyboard Language | Language of a First Component of a user's Touch Input Gesture | |
| Text Box Font (Bold) | Determined by the thickness of a Second Component of a user's Touch Input Gesture | Shape of a Third Component of a user's Touch Input Gesture |
| Text Box Font (Italic) | Shape of a Third Component of a user's Touch Input Gesture | |
| Text Box Font (Underline) | Shape of a Third Component of a user's Touch Input Gesture | |
| Text Box Font (upper case/lower case) | Upper case/Lower case status of a First Component of a user's Touch Input Gesture | |
| Signal an end to a user's Touch Input Gesture | End of a Second Component of a user's Touch Input Gesture | Recognition of a Third Component of a user's Touch Input Gesture |

TOUCH INPUT GESTURE BASED COMMAND

This patent application claims benefit to U.S. Provisional Application Ser. No. 61/606,470 filed on Mar. 4, 2012, which is hereby incorporated by reference.

BACKGROUND OF THE INVENTION

Touch sensitive displays have been incorporated into many consumer electronic devices, thus allowing for a wider array of tasks that are made available to a user. Thus users have come to now expect touch input functionality to be incorporated into all aspects of the user experience on such devices that incorporate a touch sensitive display.

Whereas the function of simply providing a virtual keyboard on a touch sensitive display at certain predetermined times may have satisfied users at one time, users now have come to demand and expect such functionality at any time, and not just at predetermined instances. For instance, a user may want to invoke a note taking function while reading a paper on a touch sensitive display but was previously denied the ability to invoke such a writing function as only a reading function was made available. Or a user may be reviewing a student paper on a touch sensitive display and wish to edit the student paper but was denied the ability to make such editing notes because again only a read function was made available.

Typically, while reading written material on a display screen of a touch sensitive display device, if a user wanted to stop and open a text box to write down some notes, the user was required to manually switch from a reading mode to a text writing mode before being allowed to input textual notes. The process for manually switching from the reading mode to the text writing mode required the multiple steps of selecting a text input mode, selecting a region on the display screen to open a text input box, configuring the font settings of the text and also setting a language mode of the text to be displayed in the text input box. All of these steps were required just to allow a user to input text, which was rather cumbersome. So there is a need to provide a simple and efficient way to provide a user with the ability to invoke a writing function on a touch sensitive display at a user's command, and according to a user's desired configuration and settings, for a device that incorporates such a touch sensitive display.

The following disclosure of the present invention will describe advantageous embodiments for a new type of touch gesture that will invoke a text input capability on a touch sensitive display device.

SUMMARY OF THE INVENTION

Accordingly, it is an object of the present invention to provide a touch sensitive display device with the means to allow a user to quickly and efficiently invoke a text input box at the user's desire. In order to achieve this objective of the present invention, a new type of touch input gesture is presented.

In order to achieve the objectives of the present invention, the present invention discloses a touch sensitive display device, comprising: a touch sensitive display configured to detect a contact from a touch input gesture; a storage unit configured to store information describing a predetermined touch input gesture for executing a display of a text input box on the touch sensitive display; a touch recognition unit configured to compare the touch input gesture detected from the touch sensitive display to the information describing the predetermined touch input gesture for executing the display of the text input box, and a system controller configured to control the display of the text input box on the touch sensitive display when the touch input gesture is recognized as being substantially similar to the predetermined touch input gesture for executing the display of the text input box.

Preferably, the touch input gesture is comprised of at least one of a letter component, a line component and a feature component.

More preferably, the touch input gesture is comprised of at least the letter component, and the touch recognition unit is further configured to recognize the letter component of the touch input gesture as being substantially in the shape of a letter in a language alphabet system, and the system controller is further configured to set a language setting of a virtual keyboard that is displayed along with the text input box to the language of the recognized letter.

More preferably, the touch input gesture is comprised of at least the line component, and the touch recognition unit is further configured to detect a thickness of the line component of the touch input gesture, and the system controller is further configured to control a letter typed in the text input box to have a bold font characteristic when a thickness of the line component of the touch input gesture is detected to be above a predetermined thickness.

More preferably, the touch input gesture is comprised of at least the feature component, and the touch recognition unit is further configured to interpret an end to the touch input gesture after recognizing the feature component of the touch input gesture.

More preferably, the touch input gesture is comprised of at least the feature component, and the touch recognition unit is further configured to recognize a shape of the feature component of the touch input gesture, and the system controller is further configured to determine a font characteristic of text to be typed in the text input box based on the recognized shape of the feature component.

More preferably, the text typed in the text input box will have an underlined font characteristic when the feature component of the touch input gesture is recognized as being substantially in the shape of the letter 'u', text typed in the text input box will have an italic font characteristic when the feature component of the touch input gesture is recognized as being substantially in the shape of the letter 'i' and text typed in the text input box will have a bold font characteristic when the feature component of the touch input gesture is recognized as being substantially in the shape of the letter 'b'.

More preferably, the touch input gesture is comprised of at least the line component, and the line component of the text input gesture is comprised of a horizontal line portion and a vertical line portion, and the system controller is further configured to set a width of the text input box to correspond to a length of the horizontal line portion of the text input gesture and set a height of the text input box to correspond to a length of the vertical line portion.

Preferably, the system controller is further configured to set a width of the text input box to correspond to a length of the touch input gesture.

More preferably, the system controller is further configured to set a height of the text input box to correspond to a length of one of a predetermined length and the width of the text input box.

Preferably, the touch recognition unit is further configured to detect an angle at which the touch input gesture is drawn on the touch sensitive display, and the system controller is further configured to control the display of the text input box to be displayed at an angle that corresponds to the detected angle at which the touch input gesture is drawn.

Preferably, the touch input gesture is comprised of at least the letter component, and the touch recognition unit is further configured to recognize an upper case and lower case status of a letter that comprises the letter component, and the system controller is further configured to control a first letter typed into the text input box to be in an upper case status when the letter that comprises the letter component is recognized as being in an upper case status, and control a first letter typed into the text input box to be in a lower case status when the letter that comprises the letter component is recognized as being in a lower case status.

Preferably, the touch recognition unit recognizes the touch input gesture as being substantially similar to the predetermined touch input gesture when a degree of similarity between the touch input gesture and the predetermined touch input gesture falls within an allowable range of variance.

Preferably, the system controller is further configured to control the display of the text input box to be partitioned so that the text input box does not overlap with objects displayed on the touch sensitive display.

Preferably, the system controller is further configured to control the display of the text input box to have a degree of transparency over portions that overlap with objects displayed on the touch sensitive display.

To further achieve objectives of the present invention, the present invention further discloses a method for recognizing a touch input gesture, comprising: storing shape feature information describing a predetermined touch input gesture on a storage unit, the predetermined touch input gesture being a command for executing a display of a text input box on the touch sensitive display; detecting a contact on a touch sensitive display that is drawn in the shape of a touch input gesture; comparing the touch input gesture detected from the touch sensitive display to the shape feature information describing the predetermined touch input gesture by a touch recognition unit, and controlling the display of the text input box on the touch sensitive display when the touch input gesture is recognized as being substantially similar to the predetermined touch input gesture.

Preferably, the touch input gesture is comprised of at least one of a letter component, a line component and a feature component.

More preferably, the method further comprises: recognizing at least the letter component from the touch input gesture as being substantially in the shape of a letter in a language alphabet system, and setting a language setting of a virtual keyboard that is displayed along with the text input box to the language of the recognized letter.

More preferably, the method further comprises: recognizing at least the line component from the touch input gesture, and setting a width of the text input box to correspond to a length of the line component of the touch input gesture.

More preferably, the method further comprises: recognizing at least the feature component of the touch input gesture, and interpreting an end to the touch input gesture after recognizing a shape of the feature component of the touch input gesture, and setting a font characteristic of text to be typed in the text input box based on the recognized shape of the feature component.

BRIEF DESCRIPTION OF THE DRAWINGS

FIG. 13 illustrates a chart describing various options for determining how to control certain features based on the shape of a touch input gesture drawn by a user on a touch sensitive display, according to the present invention.

DETAILED DESCRIPTION OF THE INVENTION

Reference will now be made in detail to exemplary embodiments of the present invention, examples of which are illustrated in the accompanying drawings. It will be apparent to one of ordinary skill in the art that in certain instances of the following description, the present invention is described without the specific details of conventional details in order to avoid unnecessarily distracting from the present invention. Wherever possible, like reference designations will be used throughout the drawings to refer to the same or similar parts. All mention of a display device is to be understood as being made to a touch sensitive display device of the present invention unless specifically explained otherwise.

It follows that a touch sensitive display device according to the present invention is able to provide a quick and efficient way for a user to invoke a text input box according to the user's desire. A touch sensitive display device according to the present invention is able to achieve this by recognizing a unique touch input gesture made by a user on the touch sensitive display device.

Figure 1A:
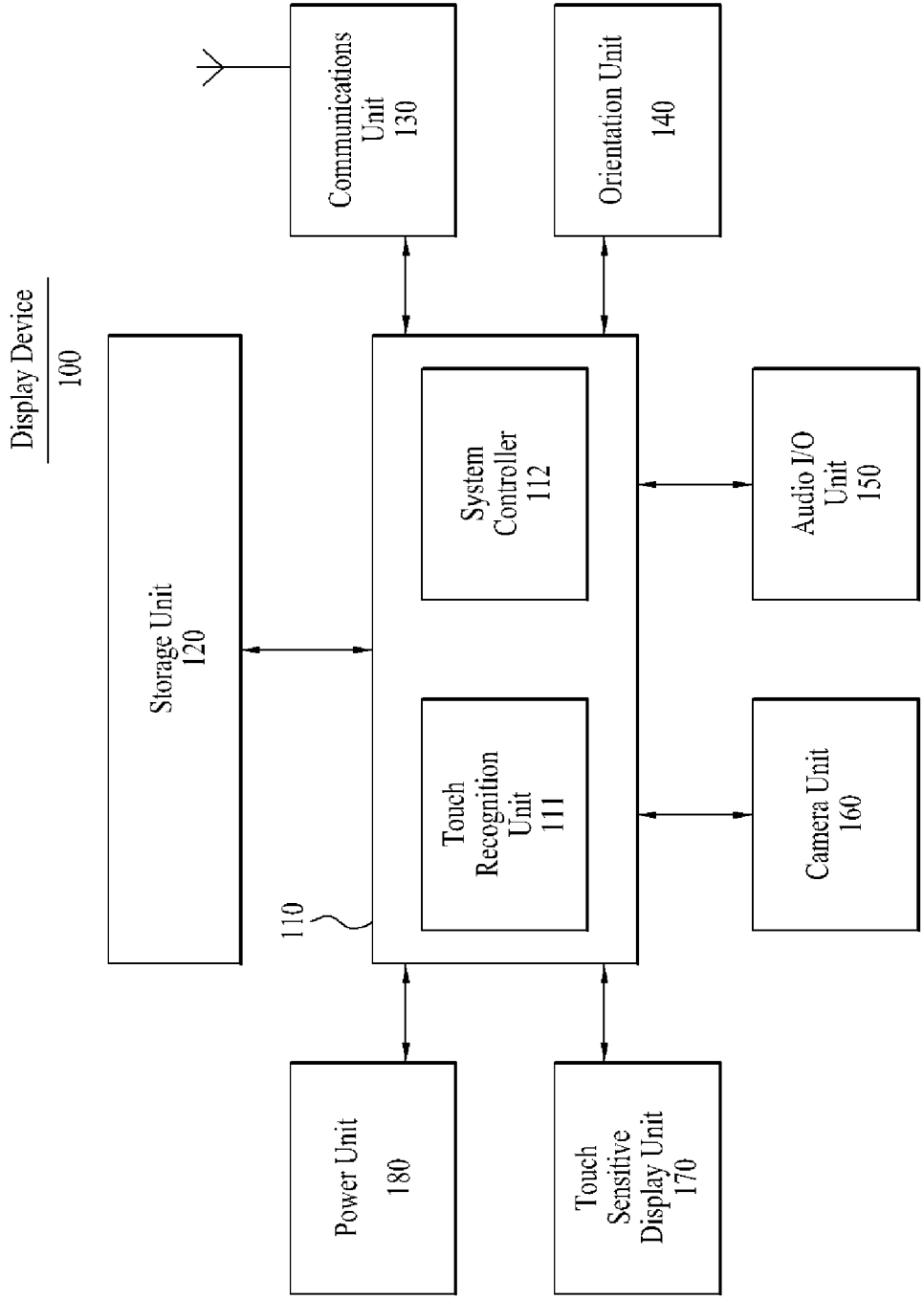
FIG. 1A illustrates a general architecture block diagram for a display device, according to the present invention.

Referring to FIG. 1A, a general architecture block diagram for a display device 100 according to some embodiments of the present invention is provided. It is to be appreciated that it is within the scope of the present invention to utilize display devices that may include a fewer, or greater, number of components than what is expressly illustrated in FIG. 1A. The display device 100 illustrated in FIG. 1A is preferably a tablet PC display device, but alternatively the display device 100 may, for example, be a mobile telecommunications device, notebook computer, personal computer, portable navigation device, portable video player, personal digital assistant (PDA) or any other similar display device that incorporates a touch sensitive display.

The display device 100 includes a touch recognition unit 111, system controller 112, storage unit 120, communications unit 130, orientation unit 140, audio input output (I/O) unit 150, camera unit 160, touch sensitive display unit 170 and a power unit. The display device 100 illustrated in FIG. 1A is depicted to have the touch recognition unit 111 and system controller included on a common chipset 110. However it is within the scope of the present invention to have the touch recognition unit 111 and system controller 112 be placed separately on an uncommon chipset according to some embodiments, and in other embodiments the capabilities of the touch recognition unit 111 and the system controller 112 may be incorporated and performed by a single processing unit.

Although not all specifically illustrated in FIG. 1A, components of the display device 100 are able to communicate with each other via one or more communication buses or signal lines. It should also be appreciated that the components of the display device 100 may be implemented as hardware, software, or a combination of both hardware and software (e.g. middleware).

The storage unit 120 illustrated in FIG. 1A may include non-volatile type memory such as non-volatile random-access memory (NVRAM) or electrically erasable programmable read-only memory (EEPROM), commonly referred to as flash memory. The storage unit 120 may also include other forms of high speed random access memory such as dynamic random-access memory (DRAM) and static random-access memory (SRAM), or may include a magnetic hard disk drive (HDD). In cases where the flexible display device is a mobile device, the storage unit 120 may additionally include a subscriber identity module (SIM) card for storing a user's profile information.

The storage unit 120 is tasked with storing various data, information and applications that are needed to operate the display device 100. As will be described in more detail throughout this description, the display device 100 of the present invention employs a touch sensitive display that allows a user to make contact on the touch sensitive display to draw unique touch input gestures. The storage unit 120 is tasked with storing information describing a touch input gesture that may be drawn on a touch sensitive display of the display device 100, where the touch input gesture may be recognized as a command for invoking a text input box to be displayed. An example for a touch input gesture that may be recognized as a command for invoking the display of a text input box can be seen by the text input gesture 210 illustrated in FIG. 2B. It is also within the scope of the present invention to allow for a variety of other touch input gestures to be recognized as commands for invoking the display of a text input box, as illustrated in FIGS. 4A-4E, FIGS. 5A-5C and FIGS. 6A-6C. In the case where the display device 100 is able to recognize more than one touch input gesture as a command for invoking the display of a text input box, the storage unit 120 may be tasked with storing the information describing each of these touch input gestures.

So the touch recognition unit 111 may be constantly detecting contacts made on the touch sensitive display unit 170 in order to determine whether a specific touch input gesture may be recognized as a predetermined touch input gesture for invoking the display of a text input box. After a touch input gesture is drawn on the touch sensitive display unit 170, the touch recognition unit 111 may compare the touch input gesture drawn on the touch sensitive display unit 170 against information stored in the storage unit 120 that describes a touch input gesture that should be recognized as invoking the display of a text input box. If the touch input gesture drawn on the touch sensitive display unit 170 is found by the touch recognition unit 111 to substantially match information stored in the storage unit 120 that describes a touch input gesture to be recognized as a command for displaying a text input box, then this information indicating a match is transmitted to the system controller 112. The system controller 112 is then responsible for controlling the touch sensitive display unit 170 to display a text input box and a virtual keyboard to allow for text input by a user. Additional characteristics of the touch input gesture may be recognized for controlling features of the text input box to be displayed. Such further description will be provided throughout the remainder of this disclosure.

In some embodiments of the present invention, the storage unit 120 may further encompass access to remote storage in a cloud storage computing environment where information describing a predetermined touch input gesture for invoking the display of a text input box may be externally stored. The actual accessing of the remote storage may be accomplished via the communications unit 130.

The communications unit 130, as illustrated in FIG. 1A, may include RF circuitry that allows for wireless access to outside communications networks such as the Internet, Local Area Networks (LANs), Wide Area Networks (WANs) and the like. The wireless communications networks accessed by the communications unit 130 may follow various communications standards and protocols including, but not limited to, Global System for Mobile Communications (GSM), Enhanced Data GSM Environment (EDGE), code division multiple access (CDMA), wideband code division multiple access (W-CDMA), time division multiple access (TDMA), Bluetooth, Wireless Fidelity (Wi-Fi), Short Message Service (SMS) text messaging and any other relevant communications standard or protocol that allows for wireless communication by the display device 100.

Additionally, the communications unit 130 may include various input and output interfaces (not shown) for allowing wired data transfer communication between the display device 100 and an external electronics device. The interfaces may include, for example, interfaces that allow for data transfers according to the family of universal serial bus (USB) standards, the family of IEEE 1394 standards or other similar standards that relate to data transfer.

The orientation unit 140 may be provided for keeping track of a positional orientation of the display device 100. Orientation information that is detected and measured by the orientation unit 140 may then be transmitted to the system controller 112, where the system controller may use this information to control other components of the display device 100 in response. For instance, the display of objects on the touch sensitive display unit 170 may be adaptively controlled by the system controller 112 in response to the information received from the orientation unit 140. In order to accomplish the function of determining the orientation of the display device 100, the orientation unit 140 may be comprised of a gyroscopic and accelerometer sensing units. Additional instances of when information from the orientation unit 140 may be referenced will be provided later in this disclosure.

The audio I/O unit 150 may be comprised of a microphone to pick up audio signals (e.g. user's voice input) that exist within the environment surrounding the display device 100, as well as speakers to output audio signals into the environment surrounding the display device 100.

The camera unit 160 illustrated in FIG. 1A may include an RGB camera for capturing images. Images captured by the RGB camera may then be stored on the storage unit 120. The camera unit 160 may additionally include a depth sensing camera. The depth sensing camera is able to capture images and measure distances of objects that are captured based on sonar type technologies or infrared type technologies.

The touch sensitive display unit 170 is comprised primarily of a touch sensitive display and the touch sensors required to detect contacts on the touch sensitive display. Preferably the touch sensors will be capacitive type sensors, but pressure type sensors may be utilized as well for the present invention.

In this way the display device 100 may be considered to be a touch sensitive display device, capable of detecting touch input contacts on its surface. In the present invention, a touch input gesture that is drawn on the touch sensitive display unit 170 according to a user's touch contact (or stylus pen contact) is then processed by the touch recognition unit 111 to determine whether the drawn touch input gesture substantially matches up to a touch input gesture intended to be recognized as a command for invoking the display of a text input box. Further descriptions will be provided later in this disclosure.

The actual touch sensitive display of the touch sensitive display unit 170 may be implemented using liquid crystal display (LCD) technology that allows for a thin display screen and touch sensitive capabilities, although other similar display technologies such as organic light emitting diode (OLED) display technology, electroluminescent display (ELD) technology or electronic paper technology may be implemented in other embodiments of the present invention.

The power unit 180 illustrated in FIG. 1A is a power source for providing the power to operate the various components/units of the flexible display device 100. The power unit 180 may include a battery or an interface for providing power from external power sources (e.g. direct current adaptor, alternating current adaptor).

Figure 1B:
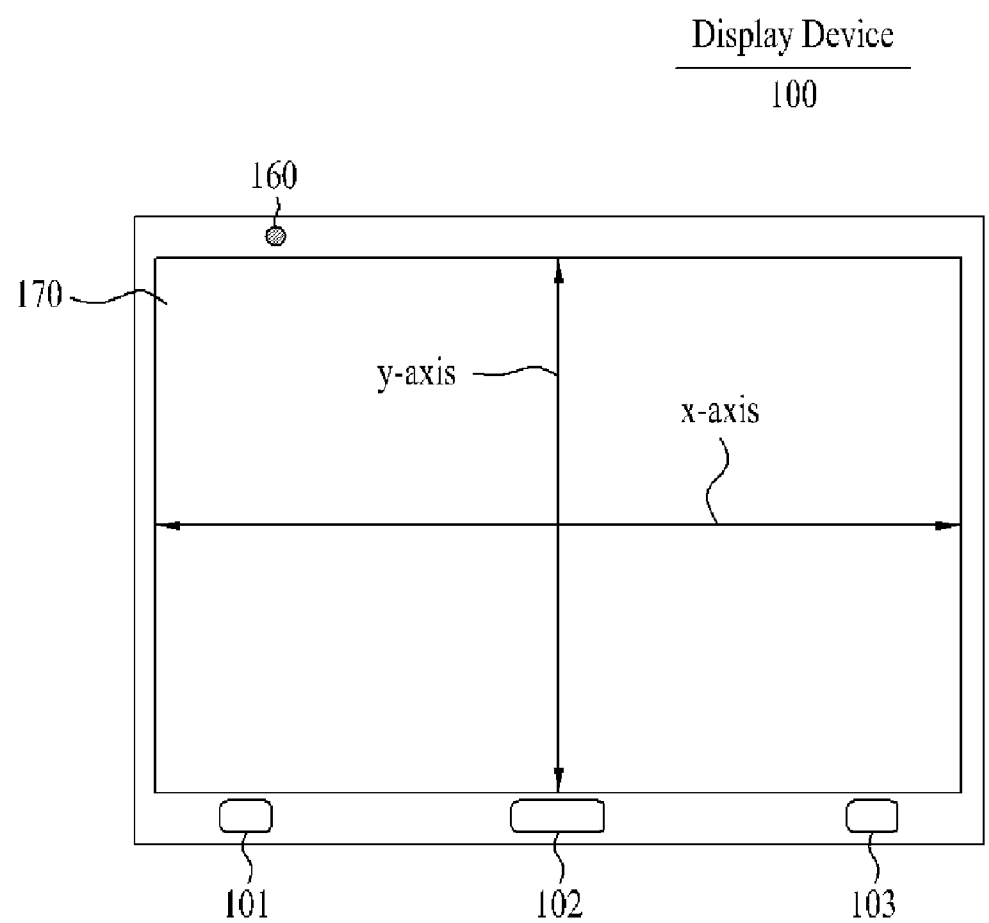
FIG. 1B illustrates a display device in a landscape viewing orientation, according to the present invention.

FIG. 1B illustrates the display device 100 as may be seen from an outside product form. In FIG. 1B the display device 100 is depicted in product form as a tablet PC display device, however the display device 100 may take on the product form of other similar display devices that incorporate a touch sensitive display. The touch sensitive display unit 170 can be seen on the front side of the display device 100, along with the camera unit 160 and a variety of operational buttons 101, 102, 103. The three operational buttons 101, 102, 103 are illustrated for exemplary purposes only, as it is within the scope of the present invention to be utilized by a touch sensitive display device that include fewer or more operational buttons. In FIG. 1B the display device 100 is depicted in a landscape orientation. The landscape orientation of the display device 100 in FIG. 1B may be detected by the orientation unit 140, and the landscape orientation information that is detected by the orientation unit 140 may then be transmitted to the system controller 112. In the landscape orientation of FIG. 1B the x-axis and y-axis may be set as illustrated in FIG. 1B.

Figure 1C:
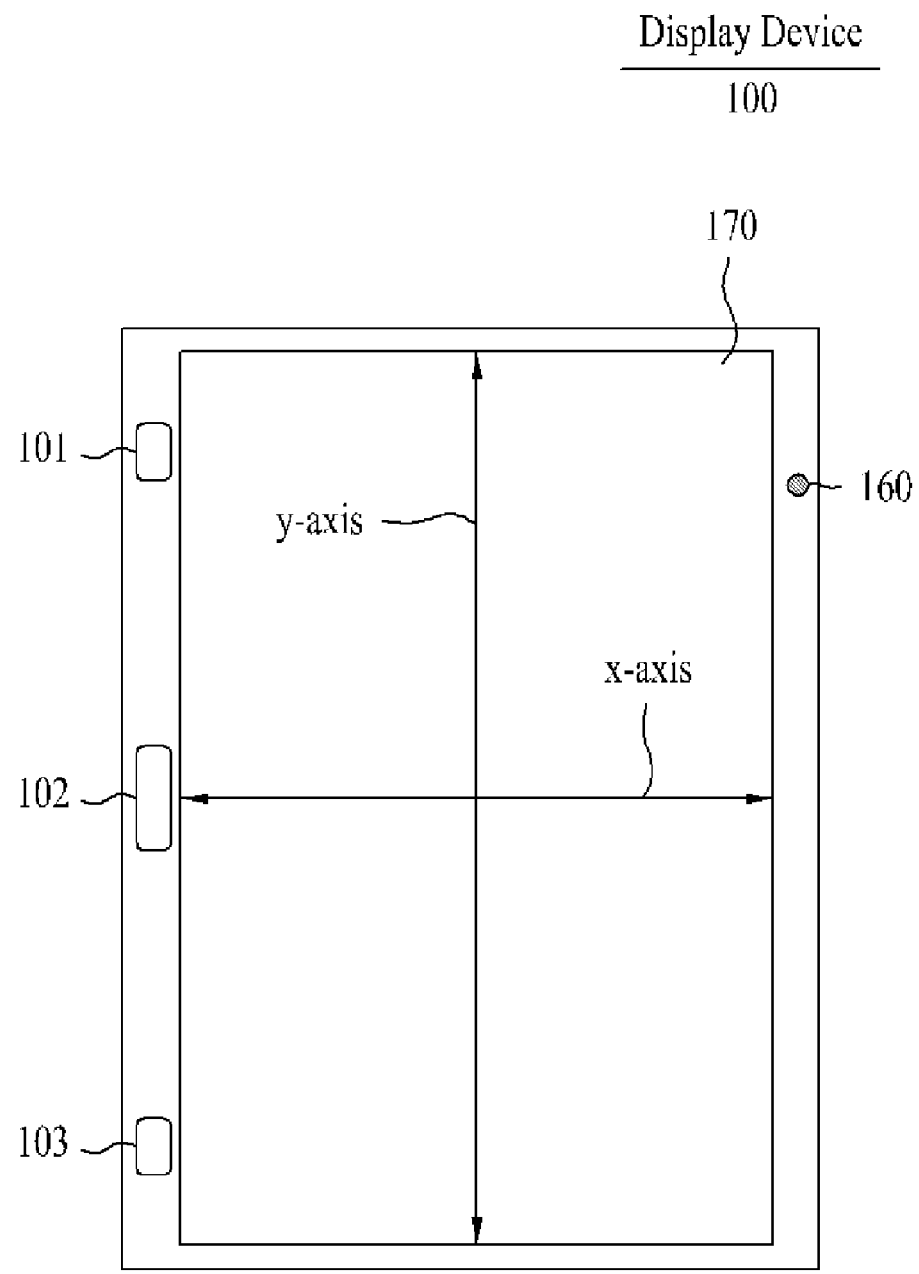
FIG. 1C illustrates a display device in a portrait viewing orientation, according to the present invention.

Similarly, FIG. 1C displays the same display device 100 that has been rotated to be viewed by a user in the portrait orientation. For the portrait orientation, the x-axis and y-axis may be flipped to be as illustrated in FIG. 1C.

Figure 2A:
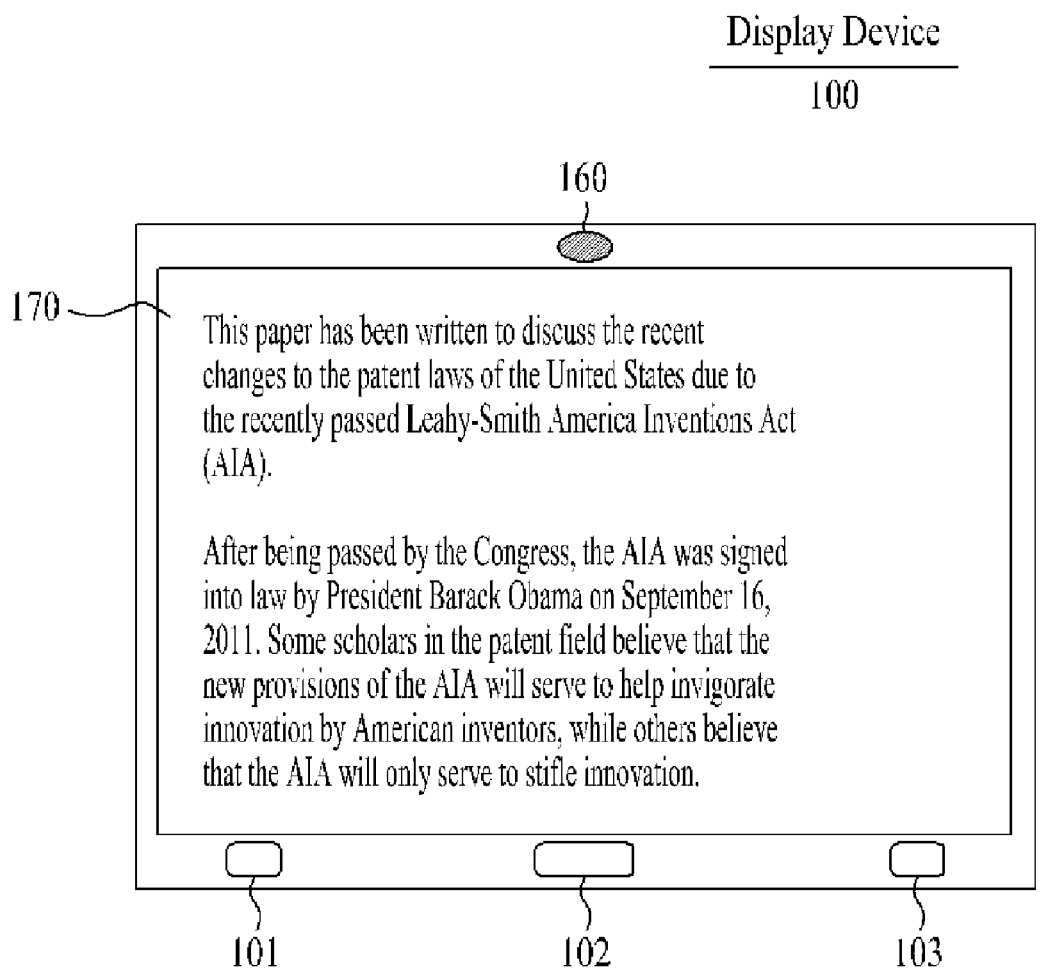
FIG. 2A illustrates written material being displayed on a display device, according to the present invention.

One of the most utilized features of a display device of any type is to read textual material. In other words, a display device is most often utilized to display written material for a user to read. FIG. 2A therefore illustrates the display device 100 of the present invention displaying written material on the touch sensitive display unit 170. Although in some instances a user may only desire to read the material that is displayed, in other instances a user may desire to write down some notes on the touch sensitive display unit 170 of the display device 100. It is in these instances where a user desires to quickly and efficiently input textual notes on a display device that the present invention comes into play.

Figure 2B:
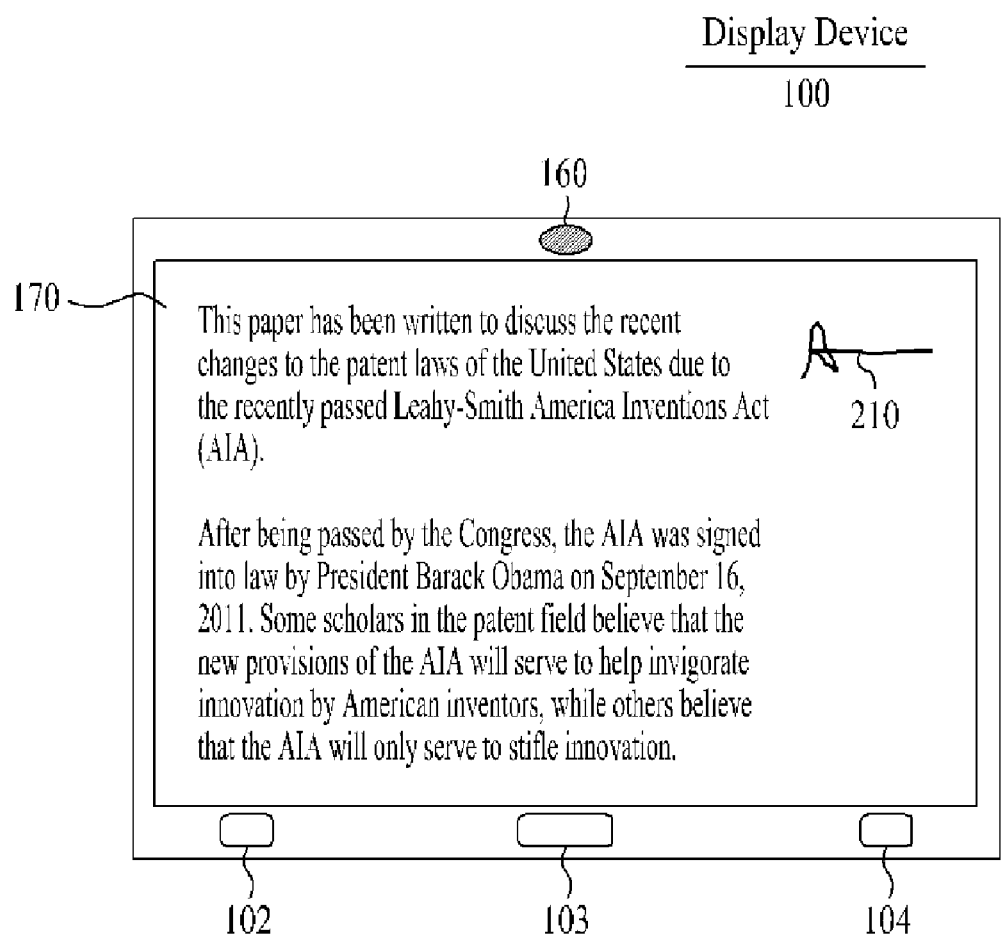
FIG. 2B illustrates a touch input gesture being drawn on a display device, according to some embodiments of the present invention.

In order to quickly and efficiently invoke the display of a text input box on the same screen as the written material on the touch sensitive display unit 170, the present invention introduces a unique touch input gesture 210 as illustrated in FIG. 2B. The touch input gesture 210 may be drawn on the touch sensitive display unit 170 by a user's finger contact, or in some embodiments the touch input gesture 210 may be drawn on the touch sensitive display unit 170 by a stylus pen.

Although the touch input gesture 210 is depicted in FIG. 2B as being drawn in a substantially free space on the touch sensitive display unit 170, the touch input gesture 210 may also be drawn to overlap over the written material that is displayed on the touch sensitive display unit 170.

Figure 2C:
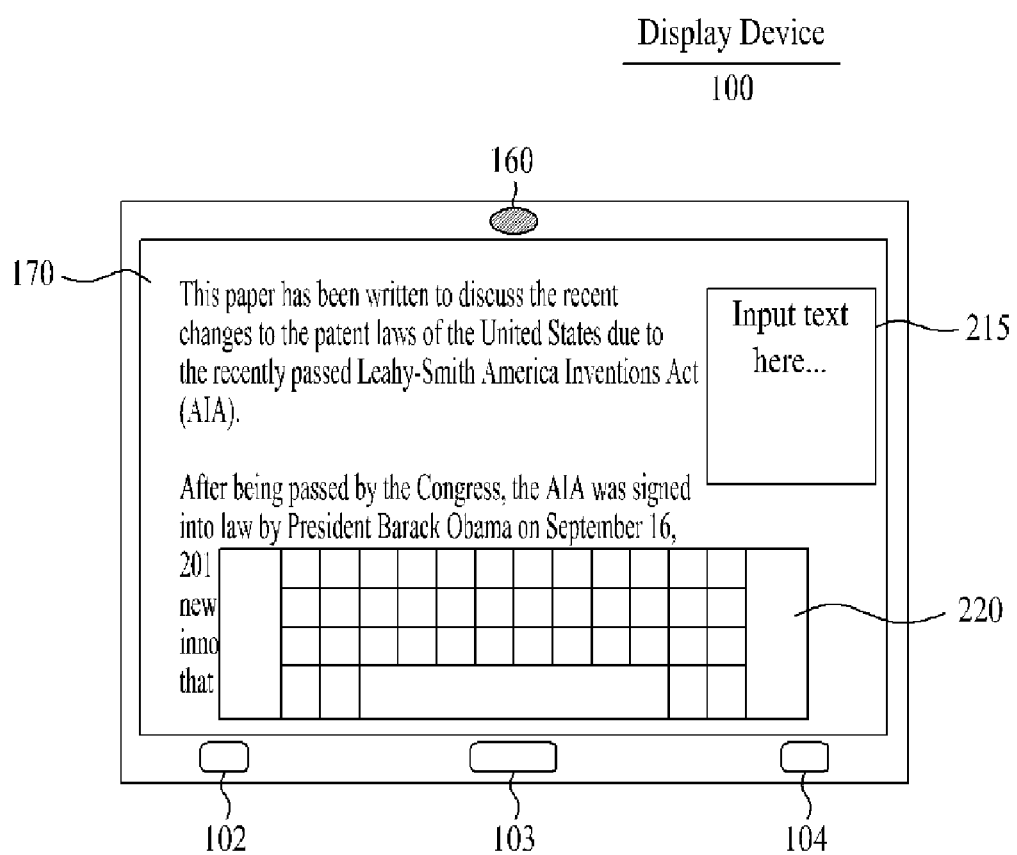
FIG. 2C illustrates a text input box and a virtual keyboard being displayed on a display device in response to the recognition of a touch input gesture drawn on the display device, according to some embodiments of the present invention.

After the touch input gesture 210 is drawn on the touch sensitive display unit 170, the touch recognition unit 111 will compare the touch input gesture 210 against information stored on the storage unit 120 that describes a touch input gesture that is to be recognized as a command for invoking the display of a text input box. If the touch recognition unit 111 determines that the touch input gesture 210 substantially matches the information stored on the storage unit 120 that describes a touch input gesture that is to be recognized as a command for invoking the display of a text input box, then a text input box 215 and virtual keyboard 220 will be displayed on the touch sensitive display unit 170 as illustrated in FIG. 2C.

It should be noted that the touch input gesture is drawn free hand on the touch sensitive display 170. The consequence of drawing the touch input gesture 210 free hand is that each instance of drawing the touch input gesture 210 will inherently have a degree of variance from previous drawings of the touch input gesture 210. It also follows that each instance of the touch input gesture 210 drawn on the touch sensitive display 170 will most likely fail to exactly match information describing a predetermined touch input gesture for invoking the displaying of a text input box that is stored in the storage unit 120. Therefore, due to the non-uniform nature of the free hand drawn touch input gesture 210, the touch recognition unit 111 must process a similarity computation that compares the free hand drawn touch input gesture 210 against the information describing the predetermined touch input gesture for invoking the display of a text input box in order to determine a degree of similarity. If the similarity computation that compares the free hand drawn touch input gesture 210 against the information describing the predetermined touch input gesture for invoking the display of a text input box returns a degree of similarity that is within an allowed range of variance, then a text input box and virtual keyboard may be displayed on the touch sensitive display unit 170. In this way, the touch input gesture 210 that is drawn on the touch sensitive display unit 170 need not exactly match the text input box invoking touch input gesture that is stored in the storage unit 120, but rather the touch input gesture 210 need only substantially match the text input box invoking touch input gesture that is stored in the storage unit 120.

The allowed range of variance may be preset. A user may also modify the allowed range of variance at any time.

In some embodiments of the present invention, information describing the text input gesture 210 that is drawn on the touch sensitive display unit 170 may be stored on the storage unit 120 as a means to "learn" a user's drawing tendencies. As information describing other such text input gestures that are drawn on the touch sensitive display unit 170 continues to accumulate in the storage unit 120, a database of information describing various drawings of the user's touch input gestures may be acquired. This database of information may then be referenced by the touch recognition unit 111 when processing a degree of similarity computation that compares the free hand drawn touch input gesture 210 against the predetermined touch input gesture for invoking the display of a text input box. By accumulating the database of information describing previously drawn instances of touch input gestures on the touch sensitive display unit 170, the display device 100 may provide a smarter method for processing a degree of similarity computation that compares the free hand drawn touch input gesture 210 against a predetermined touch input gesture for invoking the display of a text input box.

The information describing the predetermined touch input gesture for invoking the display of a text input box that is stored on the storage unit 120 ("predetermined touch input gesture") will preferably describe the shape of the touch input gesture that is to be recognized as a command for invoking the display of a text input box text. A predetermined touch input gesture that is stored in the storage unit 120 may be described as taking the shape of the predetermined touch input gesture 310 illustrated in FIG. 3. Then a comparable user drawn touch input gesture is depicted by the hand drawn touch input gesture 310-*a*. So after a user draws the touch input gesture 310-*a* on the touch sensitive display unit 170, the touch recognition unit 111 will process the similarity computation comparing the touch input gesture 310-*a* against the predetermined touch input gesture 310.

Figure 3:
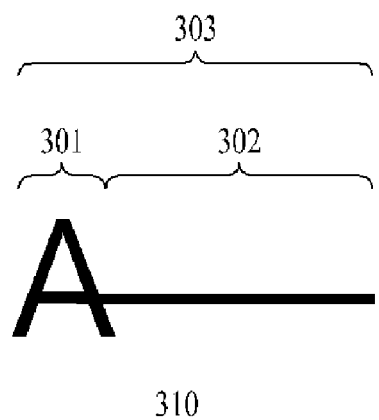
FIG. 3 illustrates a comparison between a predetermined touch input gesture for executing the display of the text input box and a touch input gesture drawn on a display device, according to some embodiments of the present invention.
Figure 3:
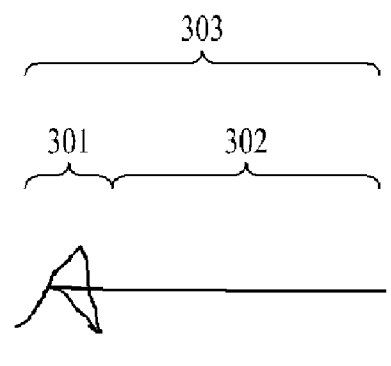

Further regarding the composition of the predetermined touch input gesture 310, FIG. 3 illustrates the predetermined touch input gesture 310 as being comprised of a first component 301 and a second component 302. The first component (ie. letter component) of the predetermined touch input gesture 310 may substantially be in the shape of a letter in an alphabet as illustrated in FIG. 3. In FIG. 3, the first component 301 of the predetermined touch input gesture 310 is depicted in the shape of the letter 'A', in accordance to the English alphabet system. Although the first component 301 of the predetermined touch input gesture 310 exemplified in FIG. 3 is described as being a letter in the English language alphabet, letters from other language alphabets may also be utilized. For example a first component of a predetermined touch input gesture may be any letter belonging to the English alphabet, Korean alphabet, Arabic alphabet, Chinese alphabet, German alphabet, Indian alphabet, That alphabet, Vietnamese alphabet, Japanese alphabet, Russian alphabet or any other known alphabet system. For simplicity reasons, additional examples for a foreign language first component of a predetermined touch input gesture according to the present invention have been illustrated in FIGS. 5A-5C in accordance to the Korean language alphabet only.

In accordance to a feature of the present invention, the language of a letter that is a first component of a predetermined touch input gesture may determine the language setting of a text input box that is displayed when a user's touch input gesture drawn on the touch sensitive display unit 170 is recognized as matching information describing the predetermined touch input gesture that is stored in the storage unit 120. It also follows that a language setting of a virtual keyboard that is displayed when a user's touch input gesture drawn on the touch sensitive display unit 170 is recognized as matching information describing a predetermined touch input gesture that is stored in the storage unit 120 may be determined by the language of a letter that is a first component of the predetermined touch input gesture.

So in the case where the predetermined touch input gesture 310 as depicted in FIG. 3 is stored in the storage device 120 and a user draws a touch input gesture 310-*a* on the touch sensitive display unit 170, much like the scene depicted in FIG. 2B, the touch recognition unit 111 may compare a first component of the touch input gesture 310-*a* and determine that the drawn first component of the touch input gesture 310-*a* is substantially similar to the first component 301 of the predetermined touch input gesture 310 that reads the letter 'A' in the English letter alphabet. By making this determination, the language setting of both the resulting text input box 215 and the virtual keyboard 220 that are subsequently displayed may be set to the English language.

In accordance to another feature of the present invention, the upper case or lower case status of a letter that is a first component of a predetermined touch input gesture may have an effect on a corresponding text input box that is to be displayed. In some languages there are separate letters for identifying an upper case letter and a lower case letter. The English language is one such language, as is the Korean language. For example there is a lower case 'a' and a separate upper case 'A' in the English language. And in the Korean language, there is a letter for a lower case 'ㄱ' and a separate letter for an upper case 'ㄲ', as exemplified by the first components illustrated in FIG. 5A and FIG. 5C respectively. Touch input gesture 510-a and 510-b are examples of how a user may draw a touch input gesture on the touch sensitive display unit 170 in a foreign language for mimicking the predetermined touch input gestures 510-A and 510-B, respectively, where the predetermined touch input gestures 510-A and 510-B incorporate lower case letters in the Korean language alphabet. Touch input gesture 510-c is another example of how a user may draw a touch input gesture on the touch sensitive display unit 170 in a foreign language for mimicking the predetermine touch input gesture 510-C, where the predetermined touch input gesture 510-C incorporates an upper case letter in the Korean language alphabet.

Thus, instead of the first component 301 of the predetermined touch input gesture 310 being in the shape of an upper case 'A' as depicted in FIG. 3, a first component of a predetermined touch input gesture may be in the shape of a lower case 'a'. This is exemplified by the predetermined touch input gesture 410-B illustrated in FIG. 4B. Thus in such cases where the letter that is a first component of a predetermined touch input gesture belongs to a language that incorporates both upper and lower case letters, the status of the letter that is the first component of a touch input gesture that is drawn on the touch sensitive display unit 170 may determine the status of a first letter that is to be typed in a corresponding text input box.

Figure 4A:
FIG. 4A illustrates a predetermined touch input gesture for executing the display of the text input box, according to some embodiments of the present invention.
Figure 4B:
FIG. 4B illustrates a predetermined touch input gesture for executing the display of the text input box, according to some embodiments of the present invention.

So in the case where the predetermined touch input gesture 410-B as depicted in FIG. 4B is stored in the storage device 120 and a user draws a touch input gesture 410-b on the touch sensitive display unit 170 that is substantially similar to the predetermined touch input gesture 410-B, the touch recognition unit 111 may process a first component of the touch input gesture 410-b and determine that the drawn first component of the touch input gesture 410-b is substantially similar to a first component of the predetermined touch input gesture 410-B that reads the lower case letter 'a' in the English letter alphabet. By making this determination, the first letter that is to be typed into a resulting text input box (e.g. text input box 215) via a virtual keyboard (e.g. virtual keyboard 220) may be set to be a lower cased letter in the English language.

Figure 6A:
FIG. 6A illustrates a predetermined touch input gesture for executing the display of the text input box, according to some embodiments of the present invention.
Figure 6A:

In accordance to another feature of the present invention, the shape of a first component of a predetermined touch input gesture may not be in the shape of a letter in a known language alphabet system as previously described. According to these embodiments, the shape of the first component may simply be in the shape of a recognizable symbol or number. For example as depicted in FIG. 6A, the first component of the predetermined touch input gesture 610-A is in the shape of a star. So when a user draws a touch input gesture 610-a attempting to mimic the star and line that comprise the predetermined touch input gesture 610-A, the touch recognition unit 111 may determine that the touch input gesture 610-a is indeed substantially similar to the predetermined touch input gesture 610-A, and a text input box may be displayed as a result.

Figure 6B:
FIG. 6B illustrates a predetermined touch input gesture for executing the display of the text input box, according to some embodiments of the present invention.
Figure 6B:
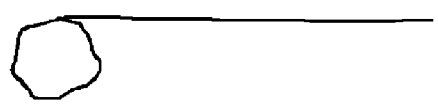

In FIG. 6B, the shape of a first component of the predetermined touch input gesture 610-B is depicted in the shape of a circle. So when a user draws a touch input gesture 610-b attempting to mimic the circle and line that comprise the predetermined touch input gesture 610-B, the touch recognition unit 111 may determine that the touch input gesture 610-b is indeed substantially similar to the predetermined touch input gesture 610-B, and a text input box may be displayed as a result.

Figure 6C:
FIG. 6C illustrates a predetermined touch input gesture for executing the display of the text input box, according to some embodiments of the present invention.
Figure 6C:

And in FIG. 6C, the first component of the predetermined touch input gesture 610-C is depicted as being in the shape of the numeral '1'. So when a user draws a touch input gesture 610-c attempting to mimic the number '1' and line that comprise the predetermined touch input gesture 610-C, the touch recognition unit 111 may determine that the touch input gesture 610-c is indeed substantially similar to the predetermined touch input gesture 610-C, and a text input box may be displayed as a result.

It should be noted that although the preceding description only described using the first letter in an alphabet as a first component of a predetermined touch input gesture, it is within the scope of the present invention to utilize any letter in a corresponding language alphabet system as the first component of a predetermined touch input gesture.

Now in describing the second component (ie. line component) of a predetermined touch input gesture, FIG. 3 depicts the second component 302 of the predetermined touch input gesture 310 being in the shape of a horizontal line that extends from the first component 301. The touch input gesture 210 that is drawn by a user in the scene depicted in FIG. 2B is also recreated by the touch input gesture 310-a in FIG. 3. According to the touch input gesture 210 that is drawn by a user in the scene depicted in FIG. 2B, a second component of the touch input gesture 210 is seen to be substantially in the shape of a horizontal line that extends out from the letter 'A', where the letter 'A' is a first component of the touch input gesture 210. This second component of the user's touch input gesture 210 drawn on the touch sensitive display unit 170 may be referenced when determining a size characteristic of a corresponding text input box 215 that is to be displayed.

In some embodiments an overall length of a touch input gesture that is drawn on the touch sensitive display unit 170 may be referenced to determine a width of a text input box that is displayed when the touch input gesture drawn on the touch sensitive display unit 170 is found to be substantially similar to a predetermined touch input gesture stored in the storage unit 120. The overall length of a touch input gesture may be referenced by the length 303 illustrated in FIG. 3. Then as to a height of the text input box that is displayed when the touch input gesture drawn on the touch sensitive display unit 170 is found to be substantially similar to a predetermined touch input gesture stored in the storage unit 120 (e.g. text input box 215), the height of such text input box may be set to a predetermined height in some embodiments while in other embodiments the height may be set to correspond to the determined width of the text input box. Specifically, according to some embodiments of the present invention, the height of a text input box may be set to equal the determined width of the text input box.

Alternatively in some embodiments of the present invention, only the length of a second component of a touch input gesture that is drawn on the touch sensitive display unit 170 may be referenced when determining the width of a text input box that is displayed when the touch input gesture drawn on the touch sensitive display unit 170 is found to be substantially similar to a predetermined touch input gesture stored in the storage unit 120. In other words, instead of referencing the overall length of a touch input gesture, in some embodiments only the length of the horizontal line portion that is the second component of a touch input gesture may be referenced to set the width of a corresponding text input box to be displayed. The length of a horizontal line portion that is the second component of a touch input gesture is illustrated by the length 302 in FIG. 3. As to a height of the text input box that is displayed when the touch input gesture drawn on the touch sensitive display unit 170 is found to be substantially similar to a predetermined touch input gesture stored in the storage unit 120, the height of such text input box may be set to a predetermined height in some embodiments while in other embodiments the height may be set to correspond to the determined width of the text input box. Specifically, according to some embodiments of the present invention, the height of a text input box may be set to equal the determined width of the text input box.

Figure 7:
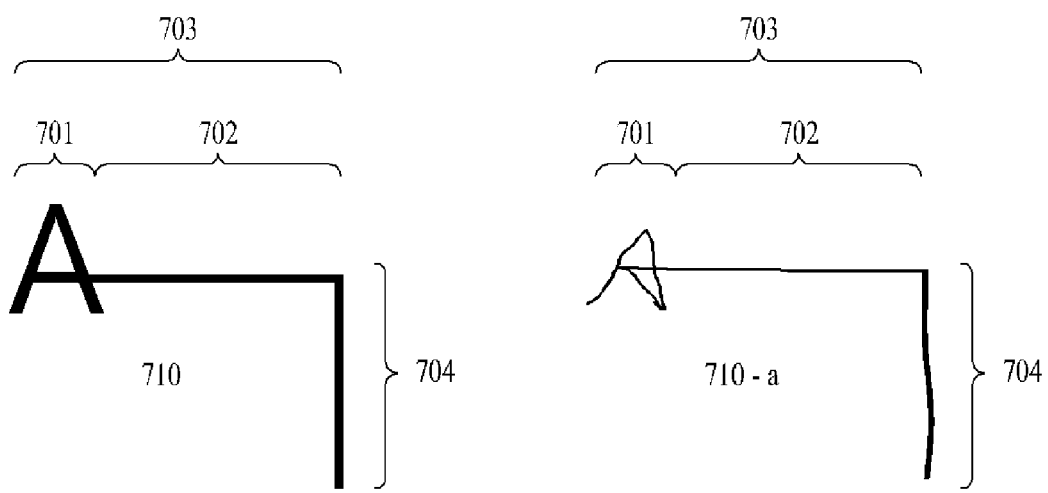
FIG. 7 illustrates a comparison between a predetermined touch input gesture for executing the display of the text input box and a touch input gesture drawn on a display device, according to some embodiments of the present invention.

Alternatively in some embodiments of the present invention, a second component of a predetermined touch input gesture may be additionally comprised of a vertical line portion in addition to the aforementioned horizontal line portion. Such a predetermined touch input gesture 710 is illustrated in FIG. 7. The predetermined touch input gesture 710 illustrated in FIG. 7 has a second component that is comprised of a horizontal line portion 702 and a vertical line portion 704. So when a user draws a touch input gesture 710-*a*, the touch recognition unit 111 may run a process for determining whether the touch input gesture 710-*a* drawn by the user is substantially similar to the predetermined touch input gesture. If the touch recognition unit 111 determines that the touch input gesture 710-*a* is indeed substantially similar to the predetermined touch input gesture 710, a text input box may be displayed as a result.

By expressly adding the vertical line portion to a second component of a predetermined touch input gesture, a user may have more control over the overall size of a corresponding text input box that is to be displayed. Specifically, a user may draw the vertical line portion of the user's touch input gesture such that the vertical line portion may be referenced when determining the height of a corresponding text input box to be displayed. Therefore the height of a text input box need not be simply set to a predetermined length or rely on a determined width of the text input box. Instead, a user may have greater control over the height of a text input box that is to be displayed by drawing the vertical line portion of the user's text input gesture to be referenced as the height of the text input box.

For instance, if a user were to draw the touch input gesture 710-*a* on the touch sensitive display unit 170 as illustrated in FIG. 7, then assuming that the touch recognition unit 111 recognizes that the touch input gesture 710-*a* is substantially similar to the predetermined touch input gesture 710, a corresponding text input box that is displayed will have a height that corresponds to the vertical line portion 704 of the touch input gesture 710-*a* that is drawn by the user.

Figure 5A:
FIG. 5A illustrates a predetermined touch input gesture for executing the display of the text input box, according to some embodiments of the present invention.
Figure 5B:
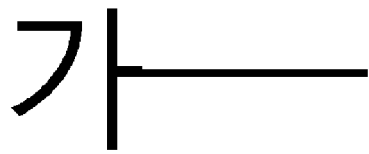
FIG. 5B illustrates a predetermined touch input gesture for executing the display of the text input box, according to some embodiments of the present invention.
Figure 5C:
FIG. 5C illustrates a predetermined touch input gesture for executing the display of the text input box, according to some embodiments of the present invention.

As to the placement of a second component of a touch input gesture that is drawn by a user, the only hard requirement is that the second component extends out from a first component of the touch input gesture. For instance the horizontal line that is the second component of a touch input gesture may be drawn by a user to extend out from a middle point of a first component of the same touch input gesture, as illustrated in FIG. 3. Or the horizontal line that is the second component of a touch input gesture may be drawn by a user to extend out from a bottom point of a first component of the same touch input gesture, as illustrated by the touch input gesture 410-A and 410-B in FIG. 4A and FIG. 4B, respectively. Similarly, in the Korean language alphabet embodiments that are illustrated in FIGS. 5A-5C, a horizontal line that is a second component of a touch input gesture is illustrated as being drawn by a user to extend out from a middle point of a first component in FIG. 5B and as being drawn by a user to extend out from a lower point of a first component in FIGS. 5A and 5C.

According to a feature of the present invention, a thickness of a line that is a second component of a user's touch input gesture that is drawn on the touch sensitive display unit 170 may be referenced to determine whether text that is typed into a corresponding text input box has a bold font characteristic. For instance, text that is typed into a corresponding text input box may have a bold font characteristic if the thickness of a line that is a second component of a user's drawn touch input gesture is greater than a predetermined thickness.

Figure 8:
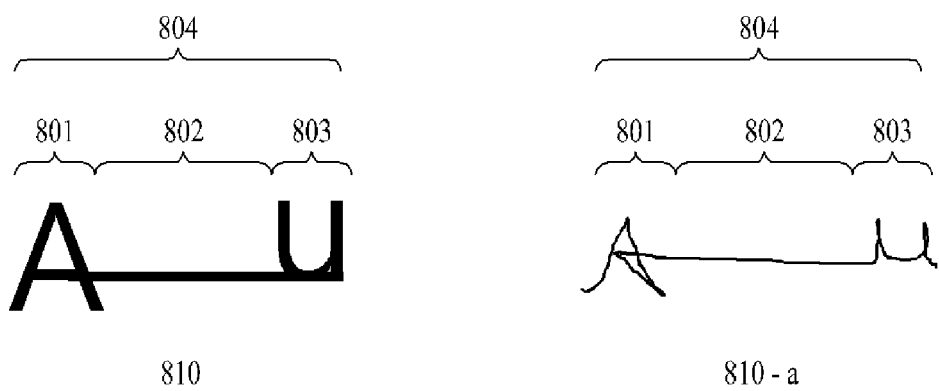
FIG. 8 illustrates a comparison between a predetermined touch input gesture for executing the display of the text input box and a touch input gesture drawn on a display device, according to some embodiments of the present invention.

According to some embodiments of the present invention, a predetermined touch input gesture may be additionally comprised of a third component (ie. feature component). FIG. 8 illustrates a predetermined touch input gesture 810 that is comprised of a first component 801, second component 802 and a third component 803. The first component 801 and the second component 802 may be understood to be the same as described above. From a user's perspective, the additional third component 803 that is drawn at the tail end of the user's touch input gesture 810-*a* may serve to indicate an end to the user's touch input gesture.

In addition, a third component of a user's touch input gesture that is drawn on the touch sensitive display unit 170 may be referenced for determining a font characteristic of text to be written in a text input box that is displayed in response to the touch recognition unit 111 recognizing that the user's touch input gesture is substantially similar to a corresponding predetermined touch input gesture. For instance, in the scene illustrated in FIG. 8 the third component 803 of the user's touch input gesture 810-*a* is depicted as being drawn to mimic the predetermined third component of the predetermined touch input gesture 810. The third component is in the shape of the letter 'u', which may be referenced to control text to be written in a newly displayed text input box to have an underlined font characteristic. Similarly, in a case where the third component is drawn in the shape of the letter T, the recognized letter T may be referenced to control text to be written in a newly displayed text input box to have an italic font characteristic. Similarly, in a case where the third component is drawn in the shape of the letter 'b', the recognized letter 'b' may be referenced to control text to be written in a newly displayed text input box to have a bold font characteristic.

Although not specifically illustrated in the drawings, a predetermined touch input gesture according to the present invention that is referenced as a command for invoking the display of a text input box may be comprised of only a single first component in some embodiments. In this simplified form, the single first component may be in the shape of any one of the first components described previously in this disclosure. Therefore when a user draws a touch input gesture on the touch sensitive display unit 170 that is recognized by the touch recognition unit 111 as being substantially similar to a predetermined touch input gesture that is comprised of a single first component, a corresponding text input box may be displayed in the area where the touch input gesture was drawn. Characteristics of the drawn touch input gesture that is comprised of the single first component may control certain characteristics of text to be typed into the displayed text input box in the same manner as the first component described previously in this disclosure.

Also, although the above embodiments have described the touch input gesture as being drawn in the order of the first component (i.e. letter component), second component (i.e.

line component) and third component (i.e. feature component), the present invention is not fixed to such order. It is within the scope of the present invention to have the touch input gesture be comprised of at least one of the letter component, line component and feature component arranged in any order.

In the drawings described previously, a text input box that is displayed as a result of a recognized text input gesture on the touch sensitive display unit 170 has been described as being displayed in a manner that is parallel to a current horizontal x-axis of the display device 100. However a user may not always desire to have a text input box displayed in such a manner, and thus the present invention also allows for a user to draw a touch input gesture on the touch sensitive display unit 170 where an angle of the touch input gesture may determine an angle at which a corresponding text input box will be displayed on the touch sensitive display unit 170. To better describe this feature of the present invention, a description will be provided with reference to FIGS. 9A, 9B and 9C below.

Figure 9A:
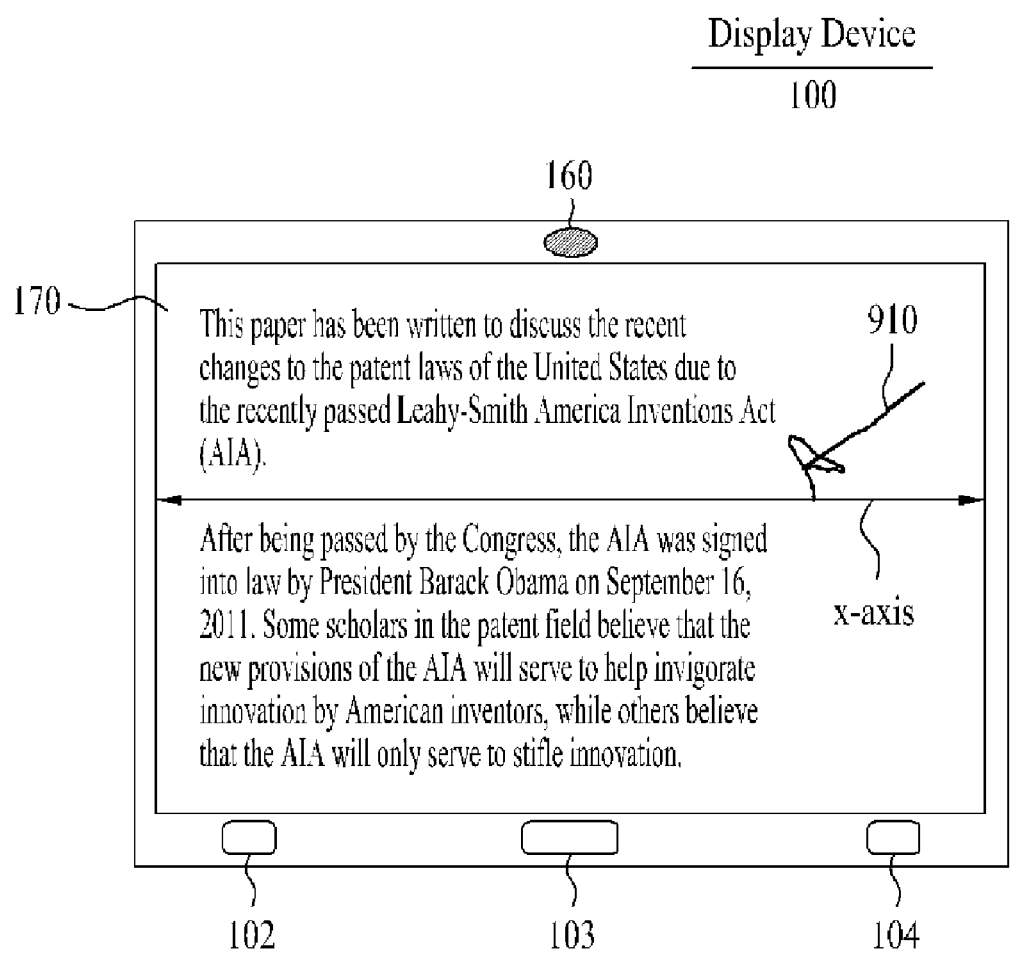
FIG. 9A illustrates a touch input gesture being drawn on a display device at an angle, according to some embodiments of the present invention.
Figure 9B:
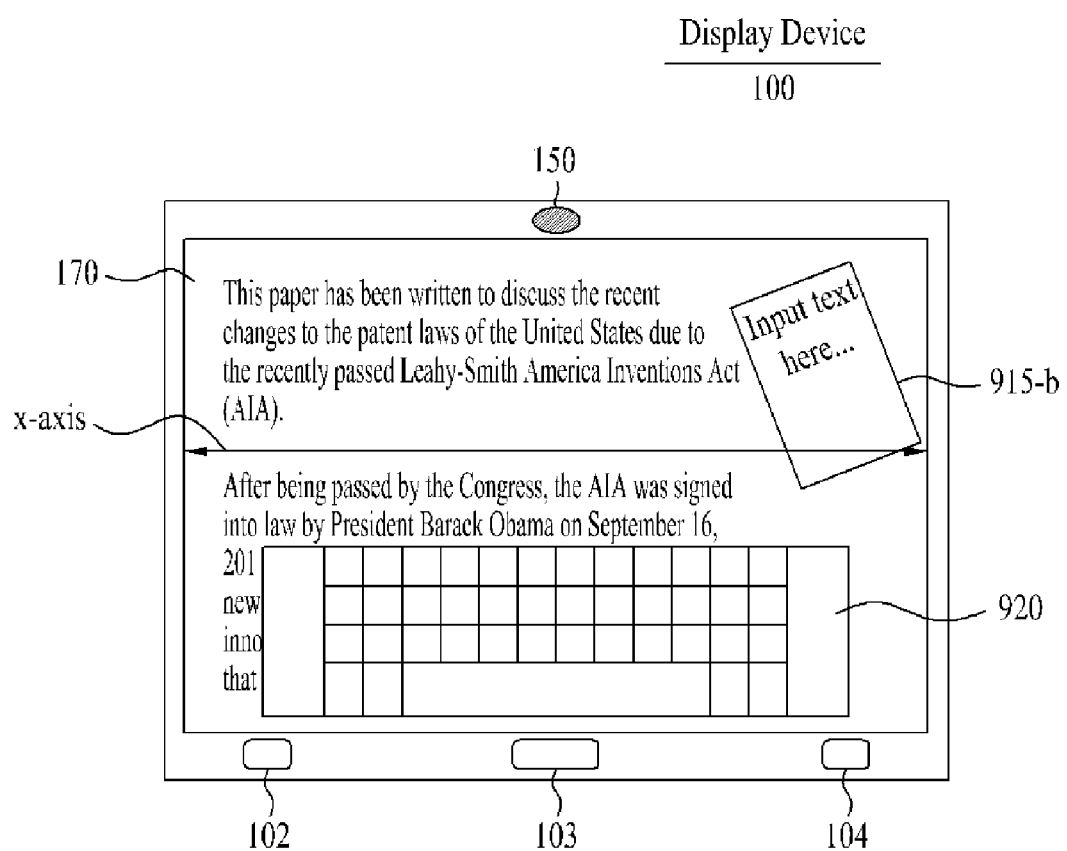
FIG. 9B illustrates a text input box and a virtual keyboard being displayed on a display device in response to the recognition of a touch input gesture drawn on the display device, where the text input box is displayed at an angle corresponding to an angle at which the touch input gesture was drawn on the display device, according to some embodiments of the present invention.

The display device 100 in FIG. 9A is shown to accept a user's touch input gesture 910, where the touch input gesture 910 has been drawn at an angle with reference to a horizontal x-axis. Assuming that the touch input gesture 910 is recognized as being substantially similar to a predetermined touch input gesture for invoking the display of a text input box, the consequence of the user drawing the touch input gesture 910 at an angle is that the corresponding text input box 915-*b* is displayed at an angle, as illustrated in FIG. 9B. The angle at which the text input box 915 makes with the horizontal x-axis may be set to correspond to the angle at which the user's touch input gesture drawn on the touch sensitive display unit 170 makes with the horizontal x-axis. For instance, the angle at which the text input box 915-*b* makes with the horizontal x-axis may be set to be equal to the angle at which the user's touch input gesture drawn on the touch sensitive display unit 170 makes with the horizontal x-axis.

Figure 9C:
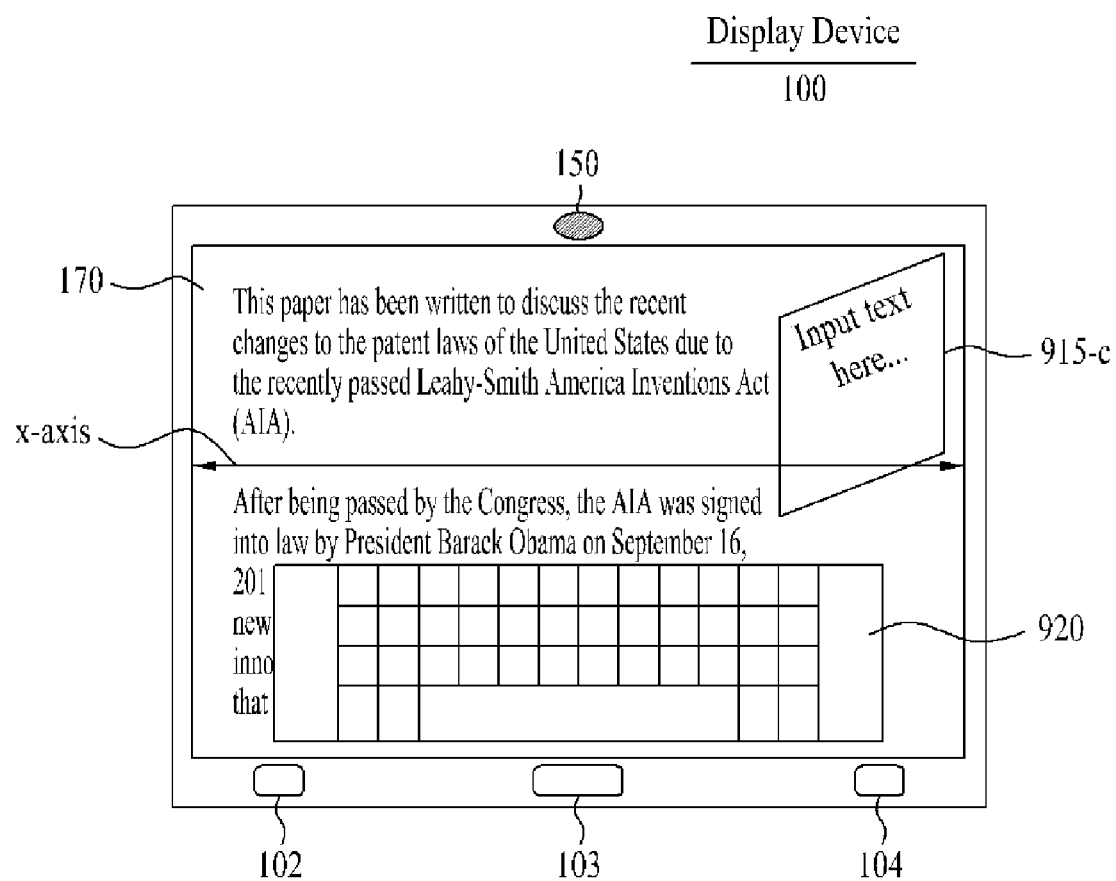
FIG. 9C illustrates a text input box and a virtual keyboard being displayed on a display device in response to the recognition of a touch input gesture drawn on the display device, where the text input box is displayed at an angle corresponding to an angle at which the touch input gesture was drawn on the display device, according to some embodiments of the present invention.

FIG. 9C illustrates a unique parallelogram shape for the text input box 915-*c* that is optimized for angled text typing that may be displayed in response to the user's touch input gesture being recognized as being substantially similar to a predetermined touch input gesture for invoking the display of such text input box 915-*c*.

Also, although not specifically illustrated in the drawings, the virtual keyboard 920 may also be displayed at an angle that corresponds to the angle of the touch input gesture 910 that is drawn on the touch sensitive display unit 170.

According to a feature of the display device of the present invention, the display device is able to perform a display adjustment of a text input box to avoid overlapping with written material that is displayed on the touch sensitive display unit 170. Specifically, after a user's touch input gesture that was drawn on the touch sensitive display unit 170 has been recognized by the touch recognition unit 111 as being substantially similar to a predetermined touch input gesture, an issue of a touch input box to be displayed overlapping with written material may occur. If the touch input box were to be displayed to overlap with written material on the touch sensitive display unit 170, the user may be irritated that the text input box is preventing the user from reading the overlapped written material. Therefore the present invention offers various solutions to deal with this potential issue.

Figure 10A:
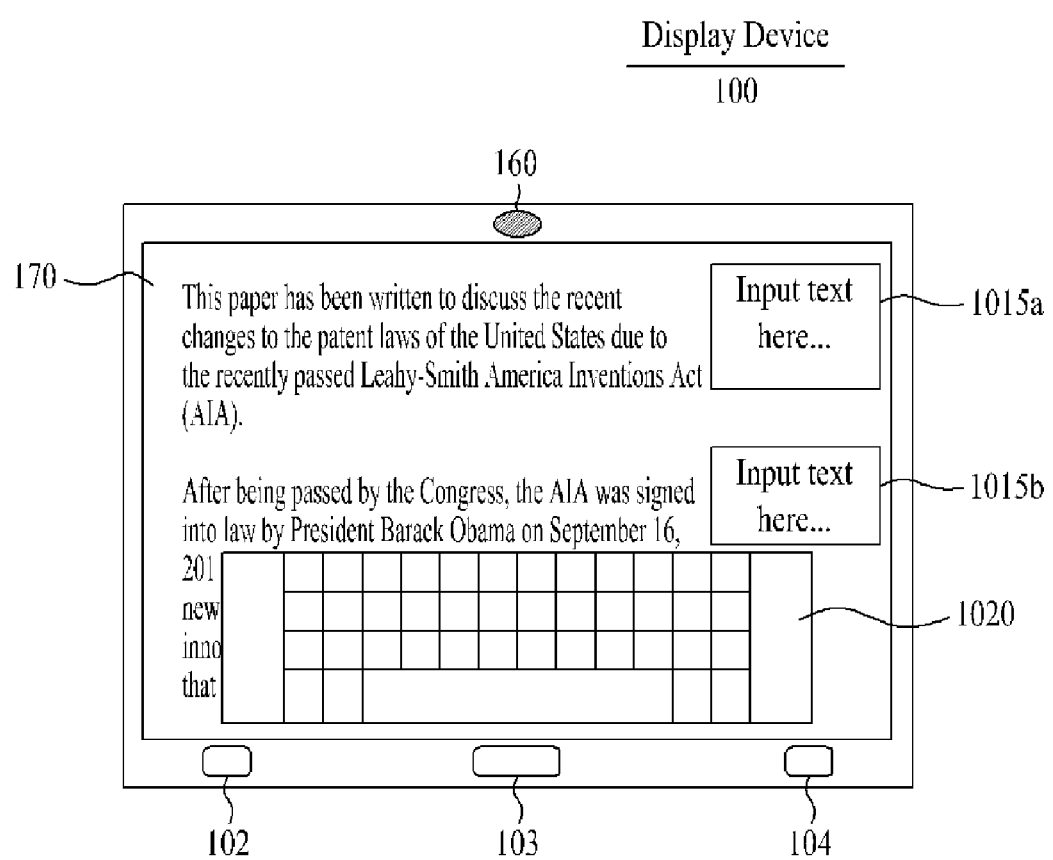
FIG. 10A illustrates a text input box and a virtual keyboard being displayed on a display device in response to the recognition of a touch input gesture drawn on the display device, where the text input box is displayed to avoid overlapping written material also displayed on the display device, according to some embodiments of the present invention.

FIG. 10A illustrates a display device 100 where a user's touch input gesture that was drawn on the touch sensitive display unit 170 has already been recognized by the touch recognition unit 111 as being substantially similar to a predetermined touch input gesture. Then the display of a corresponding text input box will be adapted to avoid overlapping with written material already being displayed on the touch sensitive display unit 170. So in FIG. 10A the text input box is seen to be split into a first text input box 1015*a* and a second text input box 1015*b* in an effort to avoid overlapping written material.

Figure 10B:
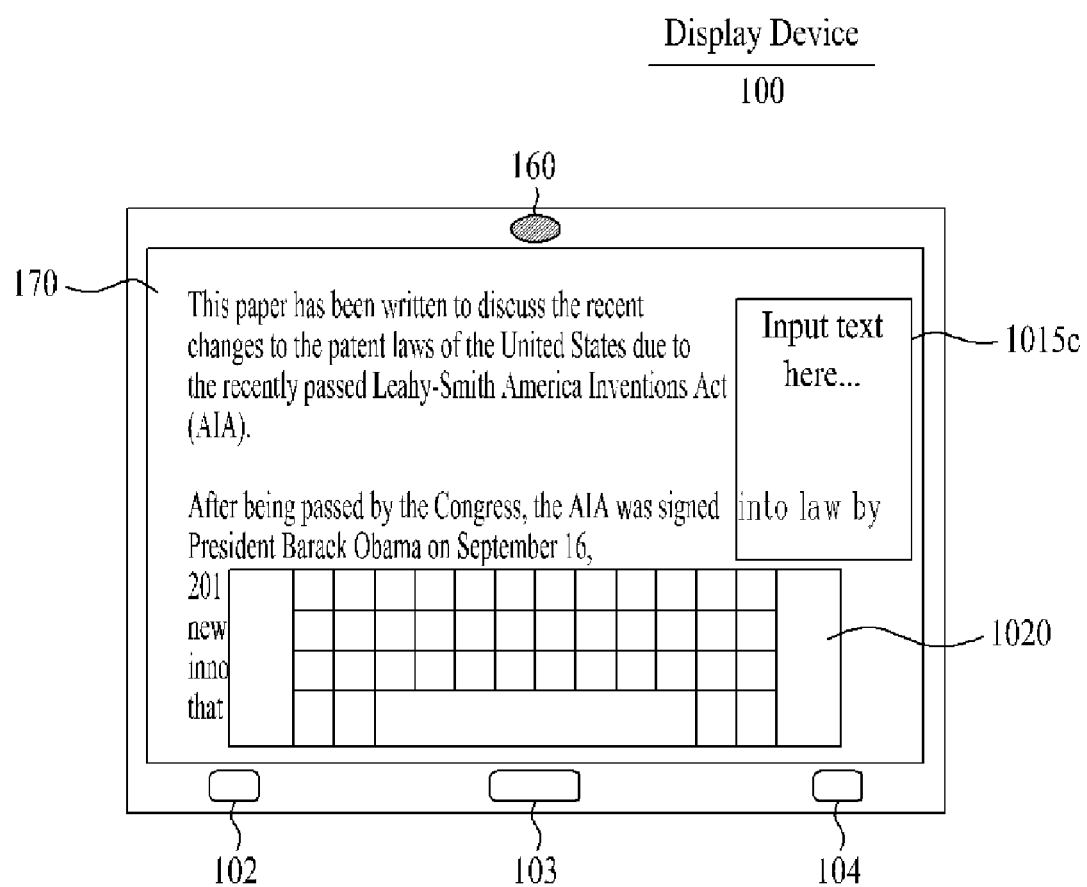
FIG. 10B illustrates a text input box and a virtual keyboard being displayed on a display device in response to the recognition of a touch input gesture drawn on the display device, where the text input box is displayed as having a degree of transparency to avoid blocking written material also displayed on the display device, according to some embodiments of the present invention.

In FIG. 10B, another embodiment of the present invention is illustrated where the text input box 1015*c* is made to have a degree of transparency to allow a user to still view overlapped written material. The virtual keyboard 1020 is illustrated as being opaque, but the virtual keyboard 1020 may also share a degree of transparency in an effort to allow a user to view overlapped written material. It should be understood that although written material has been expressly recited in the above examples, it is a feature of the present invention to adapt the display of a text input box in order to avoid overlapping any visual objects displayed on the touch sensitive display unit 170, not just written material.

Figure 11A:
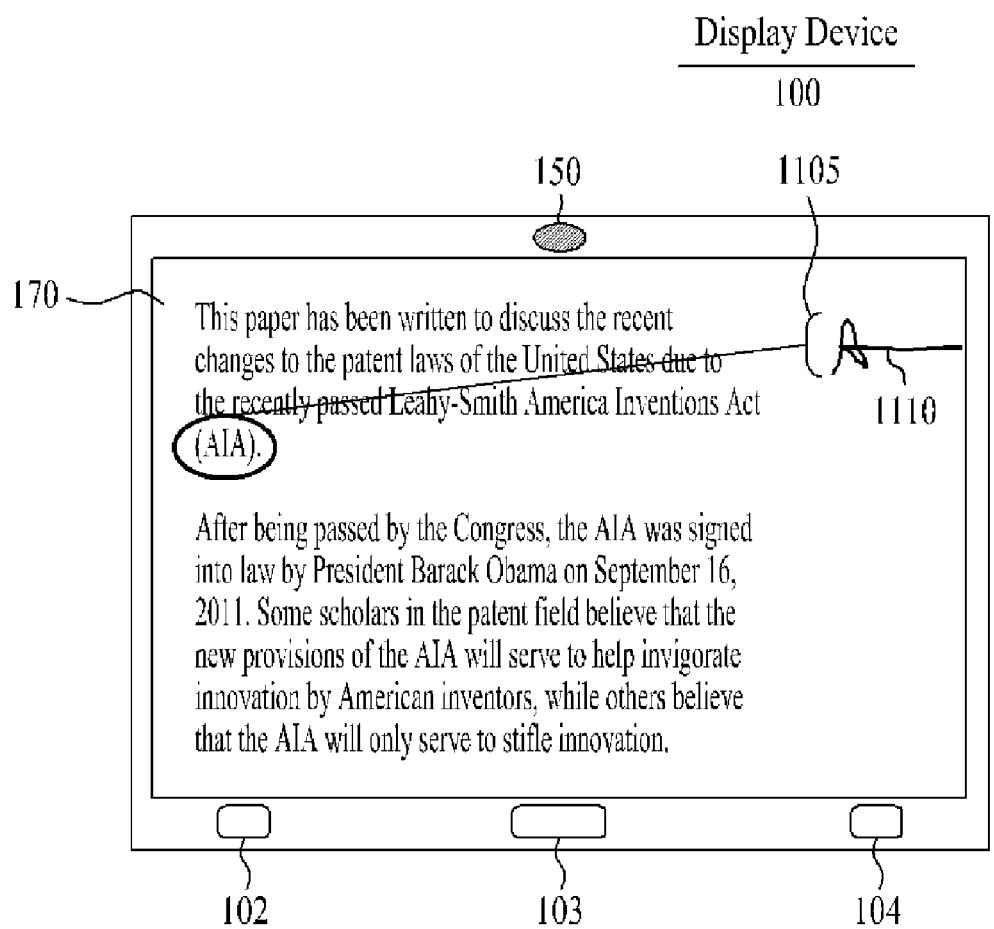
FIG. 11A illustrates a note taking notation being drawn on a display device in conjunction with a touch input gesture, according to some embodiments of the present invention.

As one of the primary reasons for allowing a user's touch input gesture to quickly and efficiently control the display of a new text input box is related to the field of editing and note taking related to written material, a user may want to draw a notation 1105 in addition to a text input gesture 1110, where the notations are used to reference parts in the written material as illustrated in FIG. 11A. Then if a text input box 1115 is displayed in response to the user's text input gesture 1110 being recognized as being substantially similar to a predetermined touch input gesture, then the notation 1105 may be helpful to connect a part in the written material with the text input box 1115 that will presumably contain notes related to the part in the written material indicated by the notation 1105 as illustrated by FIG. 11B.

Figure 11B:
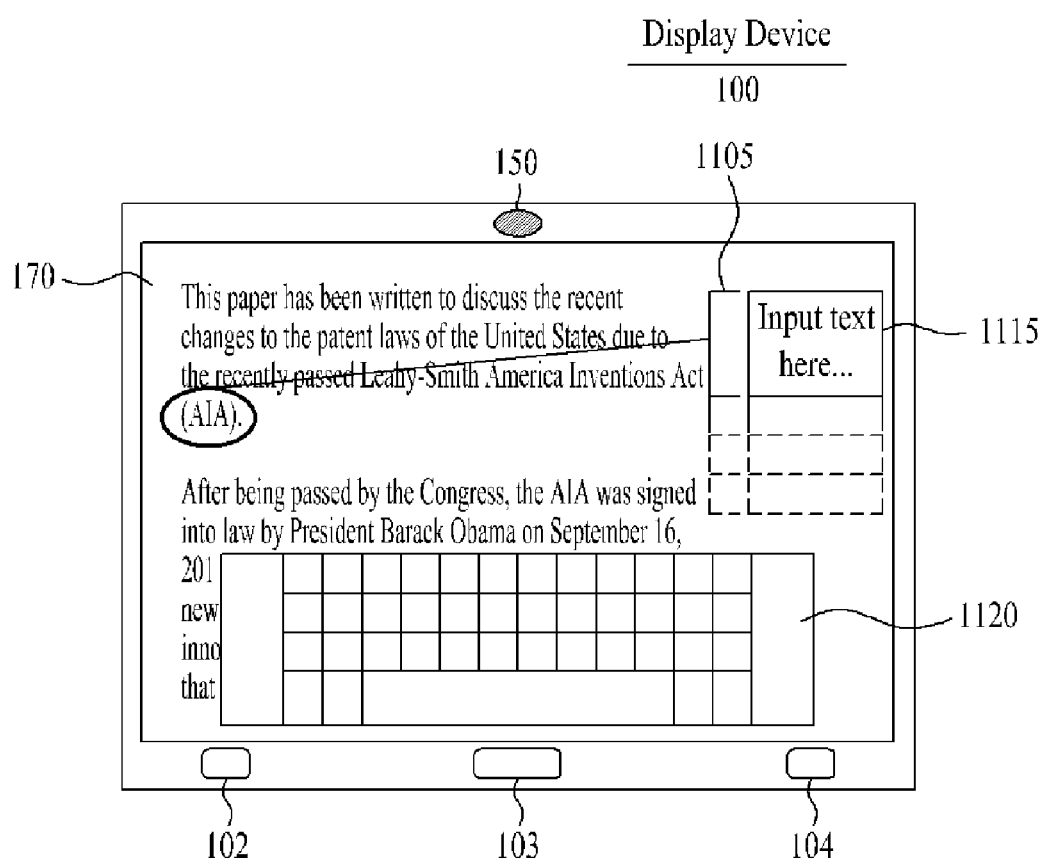
FIG. 11B illustrates adaptively adjusting a size of a note taking notation to follow a size of a text input box displayed on a display device, according to some embodiments of the present invention.

So if a user was to draw the notation 1105 indicating the specific portion of the written material in FIG. 11A, and then draw the touch input gesture 1110 for invoking the display of a text input box, then assuming the touch input gesture 1110 is recognized the text input box 1115 will be displayed along with a virtual keyboard 1120 as illustrated in FIG. 11B. Then as the user continues to type a note in the text input box 1115, the amount of text may require the text input box 1115 to increase in size. So in order to maintain an accurate connected between the notation 1105 and the text input box 1115, a feature of the present invention allows for the adaptive adjustment in the size of the displayed notation 1105 in accordance with the size of the text input box 1115.

Figure 12:
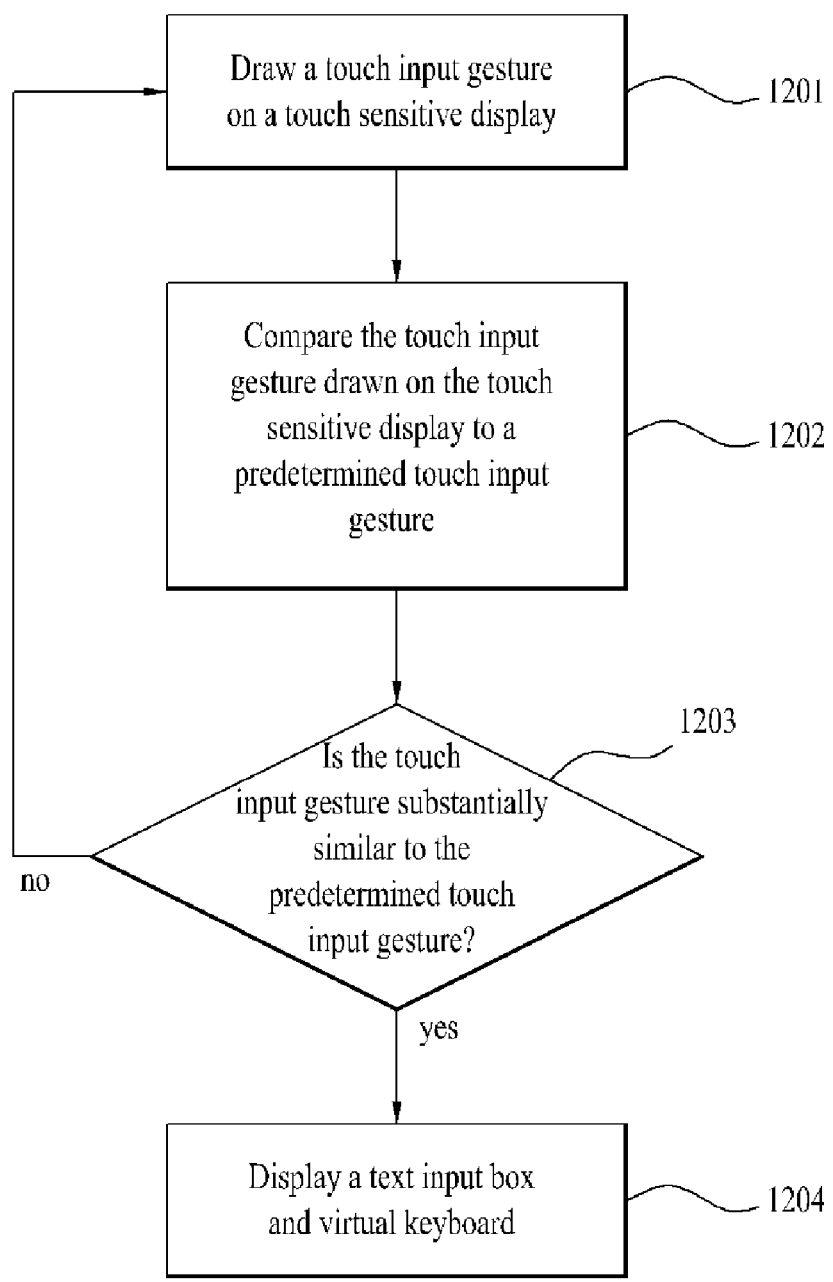
FIG. 12 illustrates a flow chart describing a method for recognizing a touch input gesture drawn by a user, according to the present invention.

FIG. 12 illustrates a flow chart diagram describing the steps utilized during a process for recognizing a touch input gesture for invoking the display of a text input box according to the present invention.

In step 1201 a user will draw a touch input gesture on a touch sensitive display screen of a display device according to the present invention. The touch input gesture that is of concern according to the present invention may be recognized as a command for invoking the display of a new text input box on the touch sensitive display screen.

Then in step 1202, a touch recognition unit will compare the touch input gesture that is drawn on the touch sensitive display screen to visual information that describes a predetermined touch input gesture. The visual information that describes the predetermined touch input gesture may be stored in a storage unit, or alternatively may be stored on an external memory storage unit that is accessible through a communication unit of the display device. The actual shape of the predetermined touch input gesture may be according to any of the predetermined touch input gestures described throughout this disclosure.

Then at step 1203, the touch recognition unit will make a comparison calculation to determine whether the touch input gesture drawn by the user is substantially similar to the predetermined touch input gesture as described by the visual information stored in the storage unit. This comparison calculation may be made according to a variety of techniques for mapping input points on the touch sensitive display screen due to the user's touch input gesture against the visual information that maps the predetermined touch input gesture. The touch input gesture drawn by the user may be determined to be substantially similar to the predetermined touch input gesture if the similarity is found to be within an allowable range of variance.

Then if the touch input gesture drawn by the user is determined to be substantially similar to the predetermined touch input gesture, then the process proceeds to step 1204 where the text input box and a corresponding virtual keyboard are displayed on the touch sensitive display screen. However if the user's touch input gesture that is drawn on the touch sensitive display screen is determined not to be substantially similar to the predetermined touch input gesture, then the process will revert back to step 1201 where a user has another opportunity to draw another touch input gesture.

FIG. 13 has been provided to better organize the various features of a text input box that may be controlled according to a shape of a touch input gesture that is drawn on a touch sensitive display device and recognized as a command for invoking the display of the text input box. For some features of the text input box, there are available a number of different ways to control the text input box feature according to a characteristic of a touch input gesture that has been drawn in accordance to the present invention.

For instance, the width of a text input box may be set to correspond to a length of a second component of a user's touch input gesture according to some embodiments of the present invention. And in other embodiments, the width of a text input box may be set to correspond to an overall length of a user's recognized touch input gesture.

In addition, the height of a text input box may be set to correspond to a predetermined length, with no reference to the width of the text input box, according to some embodiments of the present invention. And in other embodiments, the height of the text input box may be set to correspond to the determined width of the text input box, resulting in a square shaped text input box.

In addition, the language setting of a text input box and/or virtual keyboard that is displayed in accordance to an object of the present invention may be set to correspond to a language of a first component of a user's recognized touch input gesture, as previously described in this disclosure.

In addition, text that is to be typed in a text input box that has been displayed in accordance to an object of the present invention may have a bold font feature if the thickness of a second component of a user's touch input gesture is greater than a predetermined thickness amount, according to some embodiments of the present invention. And in other embodiments, text that is to be typed in a text input box that has been displayed in accordance to an object of the present invention may have a bold font feature if a third component of a user's recognized touch input gesture is recognized to be in a predetermined shape (e.g. 'd').

In addition, in some embodiments of the present invention, text that is to be typed in a text input box that has been displayed in accordance to an object of the present invention may have an italic font feature if a third component of a user's recognized touch input gesture is recognized to be in a predetermined shape (e.g. 'i').

In addition, in some embodiments of the present invention, text that is to be typed in a text input box that has been displayed in accordance to an object of the present invention may have an underlined font feature if a third component of a user's recognized touch input gesture is recognized to be in a predetermined shape (e.g. 'u').

In addition, in some embodiments of the present invention, an upper case/lower case status of a letter that is to be typed in a text input box that has been displayed in accordance to an object of the present invention may be set to correspond to an upper case/lower case status of a first component of a user's recognized touch input gesture (e.g. 'i'). In other words, if a letter that is the first component of the user's recognized touch input gesture is in an upper case status, then a letter to be typed in a corresponding text input box will share the upper case status.

In addition, in some embodiments of the present invention, an end to a user's touch input gesture is signaled by the end of a second component of the user's touch input gesture. And in other embodiments, the end to a user's touch input gesture is signaled by the recognition of a third component of the user's touch input gesture. Various examples for what constitutes a third component of a user's text input gesture are provided throughout this disclosure.

Overall, it will be apparent to those skilled in the art that various modifications and variations can be made in the present invention. Thus, although the foregoing description has been described with reference to specific examples and embodiments, these are not intended to be exhaustive or to limit the invention to only those examples and embodiments specifically described.

What is claimed is:

1. A touch sensitive display device, comprising:
   a touch sensitive display configured to detect a contact from a touch input gesture;
   a storage unit configured to store information describing a predetermined touch input gesture for executing a display of a text input box and a virtual keyboard on the touch sensitive display;
   a touch recognition unit configured to compare the touch input gesture detected from the touch sensitive display to the information describing the predetermined touch input gesture; and
   a system controller configured to control the display of the text input box and the virtual keyboard on the touch sensitive display when the touch input gesture is recognized as being substantially similar to the predetermined touch input gesture for executing the display of the text input box, the virtual keyboard being displayed along with the text input box,
   wherein the touch input gesture comprises a letter component and a line component for determining display attributes of the text input box and the virtual keyboard, and
   wherein the letter component is used for determining language setting of the virtual keyboard and the line component is used for determining size characteristic of the text input box.

2. The touch sensitive display device of claim 1, wherein the touch input gesture further comprises a feature component.

3. The touch sensitive display device of claim 2, wherein the touch recognition unit is further configured to interpret an end to the touch input gesture after recognizing the feature component of the touch input gesture when the touch input gesture includes the feature component.

4. The touch sensitive display device of claim 2, wherein the touch recognition unit is further configured to recognize a shape of the feature component of the touch input gesture, and
the system controller is further configured to determine a font characteristic of text to be typed in the text input box based on the recognized shape of the feature component.

5. The touch sensitive display device of claim 4, wherein text typed in the text input box will have an underlined font characteristic when the feature component of the touch input gesture is recognized as being substantially in the shape of a letter 'u',
text typed in the text input box will have an italic font characteristic when the feature component of the touch input gesture is recognized as being substantially in the shape of a letter 'i' and
text typed in the text input box will have a bold font characteristic when the feature component of the touch input gesture is recognized as being substantially in the shape of a letter 'b'.

6. The touch sensitive display device of claim 1, wherein the touch recognition unit is further configured to recognize the letter component of the touch input gesture as being substantially in the shape of a letter in a language alphabet system, and
the system controller is further configured to set the language setting of the virtual keyboard to the language of the recognized letter.

7. The touch sensitive display device of claim 1, wherein the touch recognition unit is further configured to detect a thickness of the line component of the touch input gesture, and
the system controller is further configured to control a letter typed in the text input box to have a bold font characteristic when the thickness of the line component of the touch input gesture is detected to be above a predetermined thickness.

8. The touch sensitive display device of claim 1, wherein the line component of the touch input gesture comprises a horizontal line portion and a vertical line portion, and
the system controller is further configured to set a width of the text input box to correspond to a length of the horizontal line portion and set a height of the text input box to correspond to a length of the vertical line portion.

9. The touch sensitive display device of claim 1, wherein the system controller is further configured to set a width of the text input box to correspond to a length of the touch input gesture.

10. The touch sensitive display device of claim 9, wherein the system controller is further configured to set a height of the text input box to correspond to a length of one of a predetermined length and the width of the text input box.

11. The touch sensitive display device of claim 1, wherein the touch recognition unit is further configured to detect an angle at which the touch input gesture is drawn on the touch sensitive display, and
the system controller is further configured to control the display of the text input box to be displayed at an angle that corresponds to the detected angle at which the touch input gesture is drawn.

12. The touch sensitive display device of claim 1, wherein the touch recognition unit is further configured to recognize an upper case and lower case status of a letter that comprises the letter component, and
the system controller is further configured to control a first letter typed into the text input box to be in an upper case status when the letter that comprises the letter component is recognized as being in an upper case status, and control a first letter typed into the text input box to be in a lower case status when the letter that comprises the letter component is recognized as being in a lower case status.

13. The touch sensitive display device of claim 1, wherein the touch recognition unit recognizes the touch input gesture as being substantially similar to the predetermined touch input gesture when a degree of similarity between the touch input gesture and the predetermined touch input gesture falls within an allowable range of variance.

14. The touch sensitive display device of claim 1, wherein the system controller is further configured to control the display of the text input box to be partitioned so that the text input box does not overlap with objects displayed on the touch sensitive display.

15. The touch sensitive display device of claim 1, wherein the system controller is further configured to control the display of the text input box to have a degree of transparency over portions that overlap with objects displayed on the touch sensitive display.

16. A method for recognizing a touch input gesture, comprising:
detecting a contact on a touch sensitive display that is drawn in the shape of a touch input gesture;
comparing the touch input gesture detected from the touch sensitive display to shape feature information describing a predetermined touch input gesture, wherein the predetermined touch input gesture is a command for executing a display of a text input box and a virtual keyboard; and
controlling the display of the text input box and the virtual keyboard on the touch sensitive display when the touch input gesture is recognized as being substantially similar to the predetermined touch input gesture, the virtual keyboard being displayed along with the text input box,
wherein the touch input gesture comprises a letter component and a line component for determining display attributes of the text input box and the virtual keyboard, and
wherein the letter component is used for determining language setting of the virtual keyboard and the line component is used for determining size characteristic of the text input box.

17. The method of claim 16, wherein the touch input gesture further comprises a feature component.

18. The method of claim 17, further comprising:
interpreting an end to the touch input gesture after recognizing the feature component of the touch input gesture when the touch input gesture includes the feature component.

19. The method of claim 17, further comprising:
recognizing a shape of the feature component of the touch input gesture, and
determining a font characteristic of text to be typed in the text input box based on the recognized shape of the feature component.

20. The method of claim 19, wherein text typed in the text input box will have an underlined font characteristic when the feature component of the touch input gesture is recognized as being substantially in the shape of a letter 'u',
text typed in the text input box will have an italic font characteristic when the feature component of the touch input gesture is recognized as being substantially in the shape of a letter 'i' and
text typed in the text input box will have a bold font characteristic when the feature component of the touch input gesture is recognized as being substantially in the shape of a letter 'b'.

21. The method of claim 16, further comprising:
recognizing the letter component from the touch input gesture as being substantially in the shape of a letter in a language alphabet system, and
setting the language setting of the virtual keyboard to the language of the recognized letter.

22. The method of claim 16, further comprising:
detecting a thickness of the line component of the touch input gesture, and
controlling a letter typed in the text input box to have a bold font characteristic when the thickness of the line component of the touch input gesture is detected to be above a predetermined thickness.

23. The method of claim 16, further comprising:
setting a width of the text input box to correspond to a length of a horizontal line portion and setting a height of the text input box to correspond to a length of a vertical line portion when the line component of the tough input gesture comprises the horizontal line portion and the vertical line portion.

24. The method of claim 16, further comprising:
setting a width of the text input box to correspond to a length of the touch input gesture.

25. The method of claim 16, further comprising:
setting a height of the text input box to correspond to a length of one of a predetermined length and the width of the text input box.

26. The method of claim 16, further comprising:
detecting an angle at which the touch input gesture is drawn on the touch sensitive display; and
controlling the display of the text input box to be displayed at an angle that corresponds to the detected angle at which the touch input gesture is drawn.

27. The method of claim 16, further comprising:
recognizing an upper case and lower case status of a letter that comprises the letter component; and
controlling a first letter typed into the text input box to be in an upper case status when the letter that comprises the letter component is recognized as being in an upper case status, and controlling a first letter typed into the text input box to be in a lower case status when the letter that comprises the letter component is recognized as being in a lower case status.

28. The method of claim 16, further comprising:
recognizing the touch input gesture as being substantially similar to the predetermined touch input gesture when a degree of similarity between the touch input gesture and the predetermined touch input gesture falls within an allowable range of variance.

29. The method of claim 16, further comprising:
controlling the display of the text input box to be partitioned so that the text input box does not overlap with objects displayed on the touch sensitive display.

30. The method of claim 16, further comprising:
controlling the display of the text input box to have a degree of transparency over portions that overlap with objects displayed on the touch sensitive display.

\* \* \* \* \*